Figure 1:
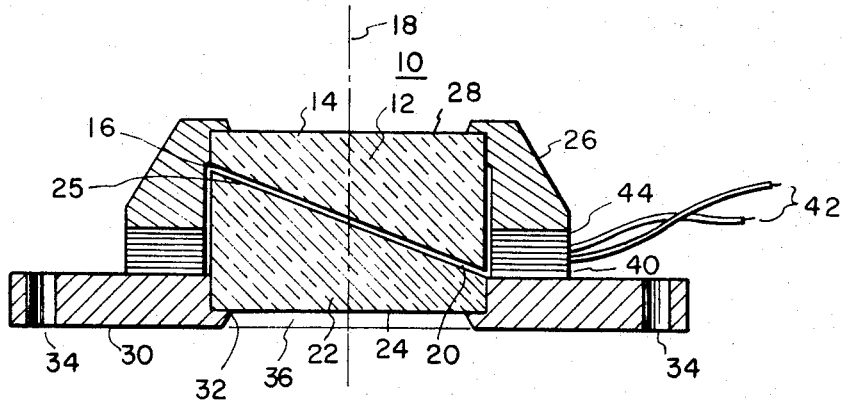

Aug. 29, 1967  R. W. ASTHEIMER  3,338,656
FRUSTRATED INTERNAL REFLECTION MODULATOR AND
A METHOD OF MAKING THE SAME
Filed Dec. 12, 1963

INVENTOR.
ROBERT W. ASTHEIMER

BY
Joseph Levinson
ATTORNEY

United States Patent Office 3,338,656
Patented Aug. 29, 1967

3,338,656
FRUSTRATED INTERNAL REFLECTION MODULATOR AND A METHOD OF MAKING THE SAME
Robert W. Astheimer, Westport, Conn., assignor to Barnes Engineering Company, Stamford, Conn., a corporation of Delaware
Filed Dec. 12, 1963, Ser. No. 330,039
2 Claims. (Cl. 350—320)

This invention relates to the modulation of electromagnetic radiation, and more particularly to a frustrated internal reflection modulation device and a method of making the same.

In measuring electromagnetic radiation, it is quite common to modulate radiation before it strikes a radiation detector to produce an AC output signal instead of a DC signal. The radiation falling on the radiation detectors normally produce weak signals which require amplification. Having an AC output signal from the detector instead of a DC signal allows the use of AC amplifiers which are more stable and less difficult to construct and operate, and accordingly more economical than DC amplifiers. When modulated or chopped radiation is used, there is no drift in the AC system as is the case with the DC system. Another advantage is the possibility of discriminating against unmodulated spurious radiation within the field of view of the detector. It is also possible to discriminate against a portion of inherent detector noise.

One of the most common means employed to modulate, or chop, radiation incident on a detector is to interpose, between the field of view and the detector, a motor-driven wheel which alternately contains sections which are opaque and transparent to the radiation being measured. The modulation or chopping frequency is determined by the number of sectors or blades in the chopper wheel and its speed of rotation.

Mechanical choppers such as have been described have certain drawbacks with respect to the weight, size, and large power requirements. Furthermore, in such uses as space application, there are maintenance problems such as bearing lubrication which limit the workable life of the modulator.

It is an object of this invention to provide a non-mechanical radiation modulator which overcomes some of the drawbacks attendant with mechanical-type modulators.

A further object of this invention is to provide a frustrated internal reflection modulator device and a method of making the same which is economical and practical.

Another object of this invention is to provide a frustrated internal reflection modulator which is small in size, light in weight, and has low power requirements.

Still another object of this invention is to provide a frustrated internal reflection modulator which has a long operating life without maintenance.

In carrying out this invention in one illustrative embodiment thereof, a pair of refracting elements are separated by an interface formed by a pair of plane parallel surfaces, each of which is a surface of one of the refracting elements, and arranged so that radiation internally incident at the interface exceeds the critical angle for total internal reflection. An electrical transducer having periodic electrical signals applied thereto is provided for controlling the separation between the plane parallel surfaces of the refracting elements so that radiation incident on the refracting elements is modulated by frustrated internal reflection depending on the spacing of the surfaces.

In accordance with another aspect of the invention, the frustrated internal reflection modulator is fabricated by attaching the first of the refracting elements and the electrical transducer to a base element, and the second refracting element to a support member. An epoxy layer is placed on the electrical transducer, and the second refracting element is mounted on the first refracting element so that the second refracting element is supported by the first refracting element with the epoxy layer separating the electrical transducer and the support member. The modulator is then cured by heating and applying a voltage to the electrical transducer to expand the electrical transducer by an amount necessary to leave a desired separation between the refracting elements when the voltage applied thereto is removed.

Figure 2:
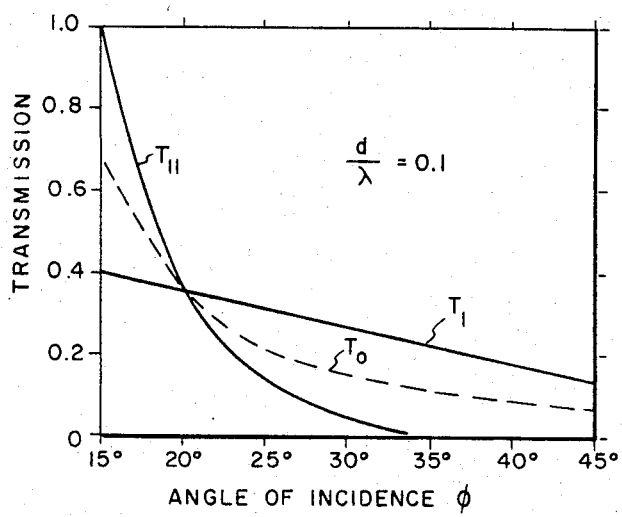
Figure 3:
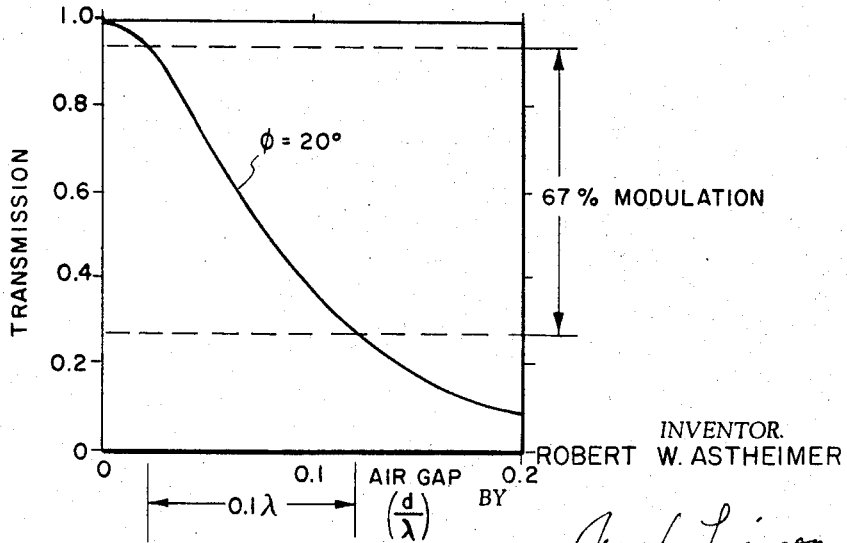

The invention, both as to its organization and method of operation, together with further objects and advantages thereof, may best be understood from the following description taken in connection with the accompanying drawings, in which:

FIG. 1 is a cross-sectional view of the frustrated internal reflection modulator embodied in this invention, FIG. 2 is a graph of the transmission of perpendicular and parallel components of radiation as a function of the angle of incidence of the radiation, and FIG. 3 is a graph of total radiation transmission vs. the gap width of the frustrated internal reflection modulator.

Referring now to FIG. 1, a frustrated internal reflection modulation device or cell is shown designated generally with the reference character 10. The modulation device 10 is comprised of a pair of plane refracting elements 12 and 22 which, in the illustrated embodiments, are prisms. The prisms 12 and 22 have plane surfaces 14 and 24, respectively, which are perpendicular to the optical and geometric axis 18 of the modulation device 10. The prisms 12 and 22 have plane parallel inclined surfaces 16 and 25 respectively, which form a small gap or interface 20 therebetween. The prism 12 is mounted in a cap 26 having a central opening 28 therein, and the lower prism 22 is mounted on an annular shoulder 32 of a support or base 30, which has on its outer extremities a pair of mounting holes 34. The support or base 30 also has a central opening 36 therein which is in alignment with the optical axis 18 and the opening 28 in the cap 26. The gap or interface 20 between the prisms 12 and 22 is controlled by an electrical transducer 40 mounted between the cap 26 and the support 30. A pair of electrical conductors 42 are connected to the electrical transducer 40 to provide the electrical drive for the transducer 40. An epoxy cement layer 44 is interposed between the cap 26 and the electrical transducer 40.

Assume now, for purposes of explanation, that the prism 22 is removed and that radiation moving along the optical axis 18 is incident on the inclined or hypotenuse surface 16 of prism 12 at an angle exceeding critical. Under such circumstances, the radiation would be totally reflected from the internal surface 16. Now, by placing the inclined or hypotenuse surface 25 of the prism 22 close by and parallel to the surface 16 of the prism 12, a portion of the radiation will penetrate the gap 20, thereby frustrating total reflection from the inclined surface 16. The amount of transmission or penetration is a function of the gap width 20, and will be maximum for total transmission when the two inclined surfaces 16 and 22 are in intimate contact, but will decrease considerably as the gap 20 opens to a few wavelengths of the incident radiation. This effect, therefore, provides a means of strongly modulating a sizable aperture such as the opening 28 with very small motions.

The transmission of radiation is dependent on the plane of polarization of the incident wave. Separate expressions are derived for the perpendicular and parallel components of radiation, which are conveniently expressed as the ratio of reflected to transmitted radiation, as follows:

$$\left(\frac{R}{T}\right)_{\perp} = \frac{(N^2-1)^2 \sin h^2 \mu}{4N^2 q^2 (N^2 p^2 - 1)} \qquad (1)$$

$$\left(\frac{R}{T}\right)_{\parallel} = (N^2 p^2 - q^2)^2 \left(\frac{R}{T}\right)_{\perp} = \left(\frac{R}{T}\right)_{\perp} \quad (2)$$

$$\mu = 2\pi\left(\frac{d}{\lambda}\right)\sqrt{N^2 p^2 - 1} \quad (3)$$

$$T = \frac{1}{1+\left(\frac{R}{T}\right)} \quad (4)$$

where:

$T$ = radiation transmitted across air gap (penetration),
$R$ = reflected radiation = $(1-T)$,
$\phi$ = angle of incidence of radiation on air gap,
$P = \sin \phi$,
$Q = \cos \phi$,
$N$ = index of refraction (for Ge, $N=4$),
$\lambda$ = wave length of radiation, and
$d$ = width of air gap.

Assuming the use of germanium for the refracting elements 12 and 22, the critical angle is 14.5° which must be exceeded for frustrated total internal reflection to take place. The transmission of the perpendicular and parallel components of radiation are plotted in FIG. 1 as a function of the angle of incidence above critical by the use of Equations 1–4 for $$\frac{d}{\lambda} = .1\mu$$

Since the gap must be extremely small in order to get appreciable transmission, it is desirable to operate at an angle of incidence which maximizes total transmission. This, of course, occurs at the critical angle, but in order to accommodate a finite field of view and some beam divergence, a larger angle, such as 20°, is utilized in the device shown in FIG. 1 which provides another advantage in that the perpendicular and parallel components of transmission are equal, and therefore provide no sensitivity to polarization. Note on FIG. 2 that the parallel and perpendicular components intersect at 20°. Assuming an angle of incidence of 20°, FIG. 2 shows a plot of total transmission vs. gap width as computed from Equation 1. The gap width is expressed as a fraction of wavelength, and assuming $10\mu$ radiation, a motion of $1\mu$ produces 67% modulation. It is thus readily apparent that in order for the frustrated internal reflection modulator to function properly, the transducer must be capable of producing fast, precise, small motions in response to a modulation frequency.

Accordingly, the transducer 40 must be able to produce small, accurate displacements between the prisms 12 and 22 to produce frustrated internal reflection and thus modulate the radiation applied to the modulation device 10. The transducer 40 may be any device which produces such small displacements with accuracy, such as piezo-electric devices, magnetostrictive devices, electrodynamic transducers, or any others which can accurately produce small changes in response to electrical signals. The preferred form of transducer for the present application is a piezo-electric structure, and more specifically, barium titanate because of its large piezo-electric coefficient which depends upon applied voltage and not on the thickness of the device. Since the displacement of the barium titanate device does not depend on its thickness but on the applied voltage, the element may be made as thin as possible without causing depolarization because of the applied voltage. The allowable field strength is about 15 volts per mil. The thickness can be halved by using a voltage which varies between negative and positive limits, such as a sine wave. If the voltage requirements are still too high, they may be reduced by making the transducer 40 a stack of devices arranged mechanically in series and connected electrically in parallel. By utilizing a stack of such elements the voltage requirements are reduced, and small accurate displacements are provided with a very small transducer. The piezo-electric transducer also dissipates very little power.

Although the modulation device 10 is illustrated in FIG. 1 with the optical and geometrical axes in alignment and further with a 20° interface corresponding to the use of germanium for the refracting elements 12 and 22, the configuration is shown merely for purposes of disclosure. The basic requirements are that the incident radiation on the front face 14 of the prism be incident at less than the critical angle and that the radiation falling on the internal surface 16 be greater than the critical angle, so that total internal reflection may take place. A number of different materials and configurations might be utilized which satisfy these requirements. Of course, the surface 22 must be parallel and separated by the gap or interface 20 from the surface 16 of the refracting element 12 in order that frustrated internal reflection may take place. It is also not essential that the transmission portion of the radiation be used, but with a proper geometrical configuration the reflected radiation could be used as the modulated output of the transducer.

Since the modulator 10 operates by controlling the gap 20 using small precise motions provided by the transducer 40 in response to electrical signals, the refracting elements 12 and 22 must be positioned and separated accurately. The modulation device 10 is fabricated to meet these critical requirements. The lower refracting element 22 is cemented on the shoulder 32 of the support or base 30, and the transducer 40 is also cemented to the base. The upper refracting element 12 is cemented to the cap 26. The device 10 is dimensioned such that when in its assembled mode, the upper refracting element 12 rests on the inclined face 25 of the lower refracting element 22, leaving a small gap between the cap 26 and the piezo-electric stack 40. An epoxy layer 44 is spread over the top of the transducer 40 and the upper refracting element 12 is lowered so that it is supported on the lower refracting element 22 with the epoxy layer 44 filling the gap between the transducer 40 and the cap 26. The epoxy layer 44 is then cured in an oven with a direct current voltage applied to the transducer 40 to expand it by an amount necessary to leave the desired separation between the refracting elements when the D.C. voltage is removed. In fabricating the device, attention must be given to the thermal expansion of the materials used to prevent excessive variations in the gap 20 with ambient temperature changes. In other words, when the transducer expands due to ambient temperature as distinguished from applied voltage, the holder for the modulator must expand enough to keep the gap width constant. As will be seen in FIG. 1, the lower refracting element 22 is mounted in the slight sunken shoulder 32 of the base 30, so that the thermal expansion of the base has little effect on the air gap. To equalize the expansion of the stack in the cap with that of the germanium prisms, the cap must have a coefficient of expansion close to that of germanium. Since barium titanate, which forms the transducer 40, has a coefficient of expansion quite close to that of germanium, little effect will take place with ambient temperature with respect to their expansions. If materials other than barium titanate and germanium are utilized for fabricating the device, their coefficients of expansion should be similar in order to avoid the difficulties encountered with changes in ambient temperature.

The modulation device 10 is controlled by electrical signals and is designed to operate maintenance-free for long periods of time with low power requirements. Its size and weight offer greater flexibility of use in radiation measuring devices than known mechanical-type modulators which have previously been used for performing similar functions.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What I claim as new and desire to secure by Letters Patent is:

1. The method of fabricating a frustrated internal reflection radiation modulation device which has first and second refracting elements and a piezo-electric device for determining the separation therebetween, comprising the steps of
   (a) attaching said first refracting element and the piezo-electric device to a base element and the second refracting element on a support member,
   (b) spreading an epoxy layer on the piezo-electric device,
   (c) placing the second refracting element on said first refracting element so that the second refracting element is supported by the first refracting element with the epoxy layer separating said piezo-electric device and said support member, and
   (d) curing said epoxy layer by heating the modulation device and applying a voltage to said piezo-electric device to expand the piezo-electric device by an amount necessary to leave the desired separation when the voltage is removed.

2. The method of fabricating a frustrated internal reflection radiation modulation device which has first and second prisms having parallel inclined surfaces and a piezo-electric device for determining the separation between the inclined surfaces, comprising the steps of
   (a) attaching said first prism and the piezo-electric device to a base element and the second prism on a support member,
   (b) spreading an epoxy layer on the piezo-electric device,
   (c) placing the second prism on said first prism so that the inclined surface of the second prism is supported by the inclined surface of the first prism with the epoxy layer separating said piezo-electric device and the support member, and
   (d) curing said epoxy layer by heating the modulation device and applying a voltage to said piezo-electric device to expand the piezo-electric device by an amount necessary to leave the desired separation between the inclined surfaces when the voltage is removed.

References Cited

UNITED STATES PATENTS 2,997,922  8/1961  Kaprelian.
3,291,554  12/1966  Price.

JEWELL H. PEDERSEN, *Primary Examiner.*

RONALD L. WIBERT, *Examiner.*